United States Patent
Komiya et al.

(10) Patent No.: US 6,903,530 B2
(45) Date of Patent: Jun. 7, 2005

(54) ELECTRIC MOTOR CONTROLLER RESONANCE FREQUENCY DETECTION APPARATUS

(75) Inventors: Takehiko Komiya, Fukuoka (JP); Toyoshi Onitsuka, Fukuoka (JP); Kazuhiro Hamasuna, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/487,021

(22) PCT Filed: Jun. 17, 2002

(86) PCT No.: PCT/JP02/06026

§ 371 (c)(1), (2), (4) Date: Feb. 17, 2004

(87) PCT Pub. No.: WO03/017459

PCT Pub. Date: Feb. 27, 2003

(65) Prior Publication Data

US 2004/0239279 A1 Dec. 2, 2004

(30) Foreign Application Priority Data

Aug. 17, 2001 (JP) ........................................ 2001-247876
Apr. 15, 2002 (JP) ........................................ 2002-111581

(51) Int. Cl.$^7$ ............................................ G05D 23/275
(52) U.S. Cl. ........................ 318/632; 318/629; 318/611; 381/71.1; 381/94.1
(58) Field of Search ................................ 318/623, 611, 318/629, 632, 638; 381/71.1, 74.1, 94.1, 94.2

(56) References Cited

U.S. PATENT DOCUMENTS

| | | | |
|---|---|---|---|
| 4,804,894 A | * 2/1989 | Machida et al. | 388/812 |
| 4,963,806 A | * 10/1990 | Shinohara et al. | 318/621 |
| 4,980,625 A | * 12/1990 | Shimada | 318/568.1 |
| 5,032,776 A | * 7/1991 | Garagnon | 318/611 |
| 5,155,422 A | * 10/1992 | Sidman et al. | 318/560 |
| 5,545,988 A | * 8/1996 | Sakai et al. | 324/212 |
| 5,867,342 A | * 2/1999 | Hattori | 360/77.08 |
| 5,960,091 A | * 9/1999 | White et al. | 381/98 |
| 6,211,640 B1 | 4/2001 | Fujisaki et al. | |
| 6,219,196 B1 | 4/2001 | Kamgami et al. | |

FOREIGN PATENT DOCUMENTS

JP 2001-157478 A 6/2001

* cited by examiner

Primary Examiner—Rina Duda
(74) Attorney, Agent, or Firm—Sughrue Mion, PLLC

(57) ABSTRACT

A resonance frequency detector for an electric motor controller in which a resonance frequency can be measured at high speed by a simple calculation and the resonance frequency can be detected by an inexpensive computer is provided. In an electric motor control system including an electric motor (3) for driving a machine, a detecting unit (5) for detecting an amount of operation of the machine (3) and a controller (2) for receiving a control command to drive the electric motor (3), a command generator (1) generates a sweep sine wave signal to input the signal to the electric motor control system, and the frequency information of the sweep sine wave signal outputted by the command generator (1) and the signal of the detecting unit (5) are inputted to output the frequency of the sweep sine wave signal when the absolute value of the signal of the detecting unit (5) becomes maximum as a resonance frequency.

8 Claims, 11 Drawing Sheets

ELECTRIC MOTOR CONTROLLER RESONANCE FREQUENCY DETECTION APPARATUS

TECHNICAL FIELD

The present invention relates to a positioning apparatus using an electric motor, and more particularly to a resonance frequency detector for an electric motor controller for detecting the resonance frequency of a machine by using a positioning control system.

BACKGROUND ART

The positioning control of semiconductor producing devices, machine tools, industrial robots or the like is frequently performed by using an electric motor. Since the positioning accuracy is greatly affected by the resonance frequencies of machines, precise resonance frequencies are desirably previously grasped. At the same time, the resonance frequencies are desirably precisely measured under a state tat a control system is attached and operated. Owing to this necessity, a method that frequency characteristics are analyzed by using a FFT to deduce the resonance frequency has been hitherto employed. The prior art is described by referring to the drawings.

FIG. 11 is a block diagram showing the structure of a prior resonance frequency detector attached to an electric motor control system. In the drawing, reference numeral 1 designates a command generator, 2 designates a controller, 3 designates an electric motor, 4 designates a machine, 5 designates a detector, 12 designates a FFT analyzer and 13 designates an output device. They operate in such a manner as described below.

The command generator 1 generates a command signal C of any of a sweep sine wave, a white noise wave, an M series wave form, an impact wave, etc. and supplies the command signal to the controller 2. When the controller 2 supplies electric current to the electric motor 3 in accordance with this command, the electric motor 3 drives the machine 4. At this time, the detector 5 detects the amount m of operation of the electric motor such as the rotating position or the rotating speed of the electric motor 3 to output a response signal S. When the command signal C and the response signal S are simultaneously inputted to the FFT analyzer 12, the FFT analyzer performs a FFT calculation and calculates frequency characteristics F. When the frequency characteristics F are inputted to the output device 13, the output device 13 outputs numeric values or graphs in visualized forms. In such a way, when a resonance frequency is measured, the resonance frequency affects the electric motor control system for stabilization.

The stabilized control system is described by referring to FIG. 12. In FIG. 12, reference numerals 2 to 5 respectively designate a controller, an electric motor, a machine and a detector the same as those of FIG. 11. Reference numeral 7 designates a closed-loop controller and 8 designates a filter processing part. The filter processing part 8 is provided to suppress the resonance frequency of this control system. The frequency thereof is set by manually inputting a filter part input value B corresponding to the measured resonance frequency. When the frequency is set as described above, a desired operation command M is supplied to allow the control system to perform a desired operation so that the machine 4 is driven by the electric motor 3.

However, according to the prior art, a calculation using a large quantity of data has been necessary to measure the resonance frequency by a FFT. Since a FFT analyzer which is not ordinarily used for controlling the electric motor needs to be separately prepared or an expensive computer which can performs a FFT calculation and a large quantity of calculation process is required, a calculation time has been disadvantageously increased, a cost has been increased, and further, a maneuverability has been not good.

DISCLOSURE OF THE INVENTION

It is an object of the present invention to provide a resonance frequency detector for an electric motor controller in which a resonance frequency can be measured at high speed by a simple calculation and a resonance frequency can be detected by an inexpensive computer.

A resonance frequency detector according to the present invention includes an electric motor control system including an electric motor for driving a machine, a detecting unit for detecting an amount of operation of the machine and a controller for receiving a control command to drive the electric motor. The electric motor control system comprises a command generator for generating a sweep sine wave signal to input the signal to the electric motor control system and a signal processor for inputting the frequency information of the sweep sine wave signal outputted from the command generator and the signal of the detecting unit to output the frequency of the sweep sine wave signal when the absolute value of the signal of the detecting unit becomes maximum as a resonance frequency.

An embodiment of the invention is characterized in that the detecting unit detects the position or the speed of the electric motor, or the position or the speed of the machine as the amount of operation, and is characterized in that when the electric motor control system is an open loop, the signal of the command generator is inputted to the controller.

Another embodiment of the invention is characterized in that when the electric motor control system includes a subtracter for inputting the signal of the detecting unit to a (−) terminal and a closed-loop controller for receiving the signal of the subtracter and outputting a control command to the controller to form a closed-loop, the signal of the command generator is inputted to a (+) terminal of the subtracter.

Yet another embodiment of the invention is characterized in that when the electric motor control system includes the subtracter for inputting the signal of the detecting unit to the (−) terminal, the closed-loop controller for receiving the signal of the subtracter and outputting the control command and a filter processing part for inputting the control command, reducing the signal of a prescribed band and then outputting the signal to the controller to form a closed-loop, an adder is provided between the filter processing part and the controller, the signal of the command generator is inputted to one input thereof and the sum of the signal of the command generator and the signal of the filter processing part is inputted to the controller.

Still another embodiment of the invention is characterized in that the frequency of the sweep sine wave signal is limited to a range from a minimum frequency $F_{min}$ to a maximum frequency $F_{max}$ and the signal processor limits the signal of the detecting unit to a prescribed frequency range and inputs the limited signal and detects only the frequency not lower than the minimum frequency $F_{min}$.

Still another embodiment of the invention is characterized in that the frequency of the sweep sine wave signal is limited to the range from the minimum frequency $F_{min}$ to the maximum frequency $F_{max}$ and the signal processor limits the signal of the detecting unit to the prescribed frequency range and inputs the limited signal and detects only the frequency not lower than a detected minimum frequency Flim higher than the minimum frequency $F_{min}$.

Still another embodiment of the invention is characterized in that a high-pass filter is provided between the detector and the signal processor.

According to the present invention with the structure as described above, the resonance frequency can be measured at high speed by a simple calculation and can be detected by an inexpensive computer.

BEST MODE FOR CARRYING OUT THE INVENTION

Figure 1:
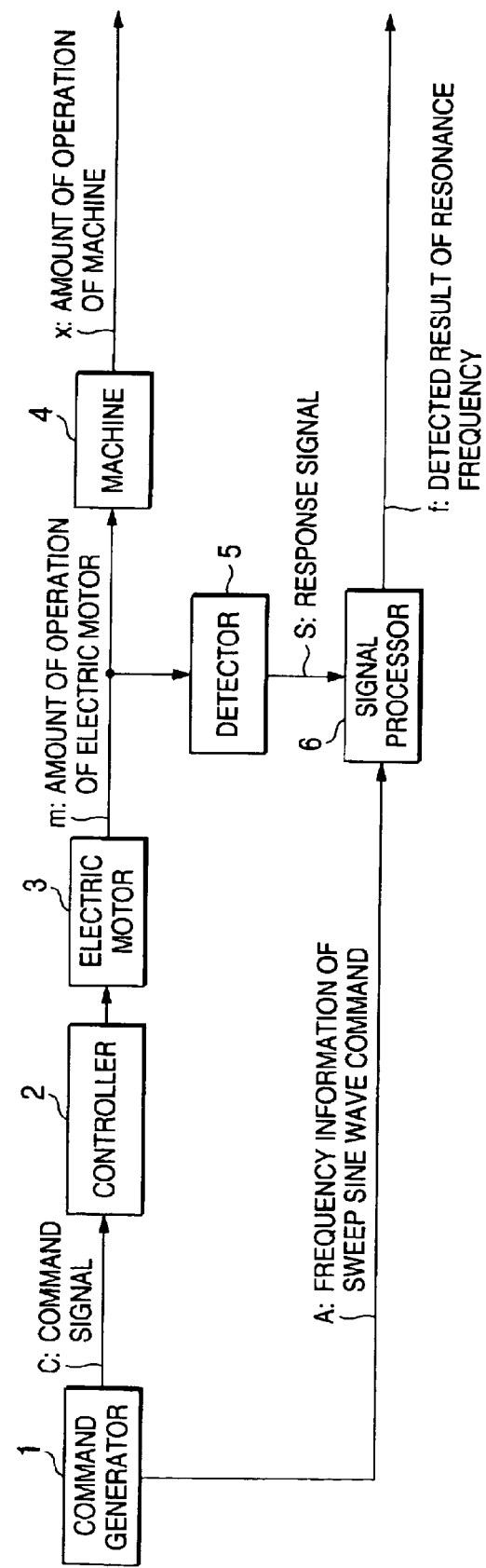
FIG. 1 is a block diagram showing the structure of an electric motor control system to which the present invention is applied.
Figure 8:
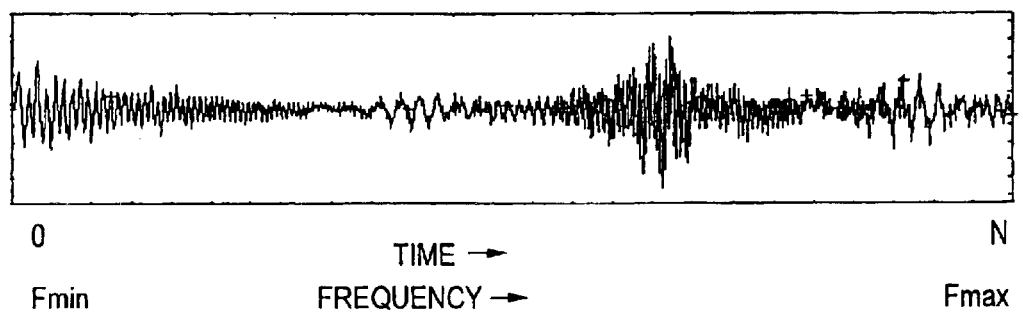
FIG. 8 shows a time wave form of a command signal generated by a command generator.

Now, embodiments of the present invention will be described by referring to the drawings. FIG. 1 is a block diagram showing the structure of a resonance frequency detector of the present invention. In the drawing, reference numeral 1 designates a command generator, 2 designates a controller, 3 designates an electric motor, 4 designates a machine, 5 designates a detector and 6 designates a signal processor. The command generator 1 outputs a sweep sine wave command whose frequency changes from a minimum frequency $F_{min}$ to a maximum frequency $F_{max}$ as a command signal C. The command generator simultaneously outputs the information A of the frequency of the command signal C that changes continuously. The controller 2 drives the electric motor 3 in accordance with the command signal C received from the command generator 1 and the machine 4 connected thereto operates. The detector 5 connected to the electric motor 3 detects an amount m of operation of the electric motor as shown in FIG. 8 and supplies the amount m of operation of the electric motor to the signal processor 6 as a response signal S. In this figure, since the electric motor 3 is connected to the machine 4, if the amount m of operation of the electric motor is detected, the resonance characteristics of the machine 4 can be detected. Since the machine 4 has resonance characteristics showing a large reaction even to a small external force depending on the frequency, the amplitude of a resonance frequency in the response signal S becomes maximum.

The signal processor 6 receives the frequency information A of the sweep sine wave command and the response signal S to perform a calculation for detecting the resonance frequency from a detected minimum lower limit frequency $F_{lim}$ exceeding a minimum frequency $F_{min}$. The frequency of the sweep sine wave not lower than the detected minimum lower limit frequency $F_{lim}$ when the absolute value of the response signal S becomes maximum as shown in FIG. 8 is determined to be the resonance frequency and the detected result f of a resonance frequency is outputted.

Figure 9:
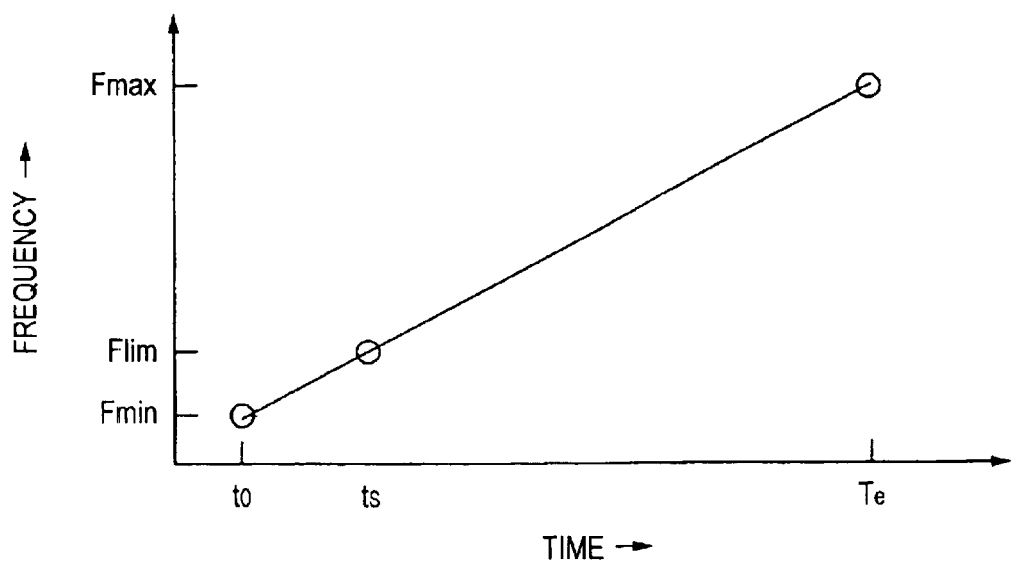
FIG. 9 is a diagram showing the relation between the frequency of a sweep sine wave and time according to the present invention.

FIG. 9 is a graph showing the relation between the frequency of the sweep sine wave and time. The sweep sine wave command whose frequency changes from the minimum frequency $F_{min}$ to the maximum frequency $F_{max}$ via the detected minimum lower limit frequency $F_{lim}$ during time from $t_0$ to $t_e$ serves as the command signal C. The signal processor 6 detects the resonance frequency during the time from $t_s$ to $t_e$ in which the frequency of the sweep sine wave is higher than the detected minimum lower limit frequency $F_{lim}$.

In the first embodiment, although the detector 5 detects the amount m of operation of the electric motor, the detector may detect an amount x of operation of the machine 4. Further, the relation between the time and the frequency of the sweep sine wave may not be restricted to a straight line, and may be an arbitrary curve.

Further, the detected minimum lower limit frequency $F_{lim}$ may be likewise treated as the minimum frequency $F_{min}$.

Figure 2:
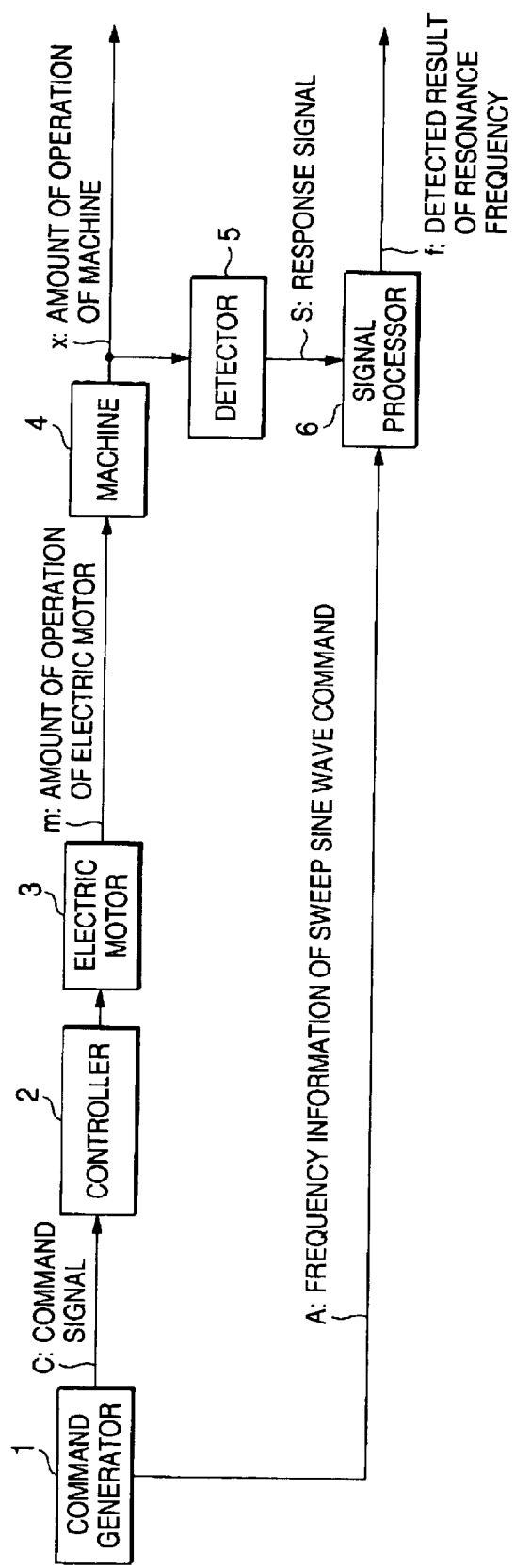
FIG. 2 is a block diagram showing the structure of a second embodiment.

FIG. 2 is block diagram showing the structure of a second embodiment. FIG. 2 is different from FIG. 1 from the viewpoint that a detector 5 detects an amount x of operation of a machine 4. A signal processor 6 receives the frequency information A of a sweep sine wave command and a response signal S to decide the frequency of the sweep sine wave when the absolute value of the response signal S becomes maximum as a resonance frequency and output the detected result f of a resonance frequency.

Figure 3:
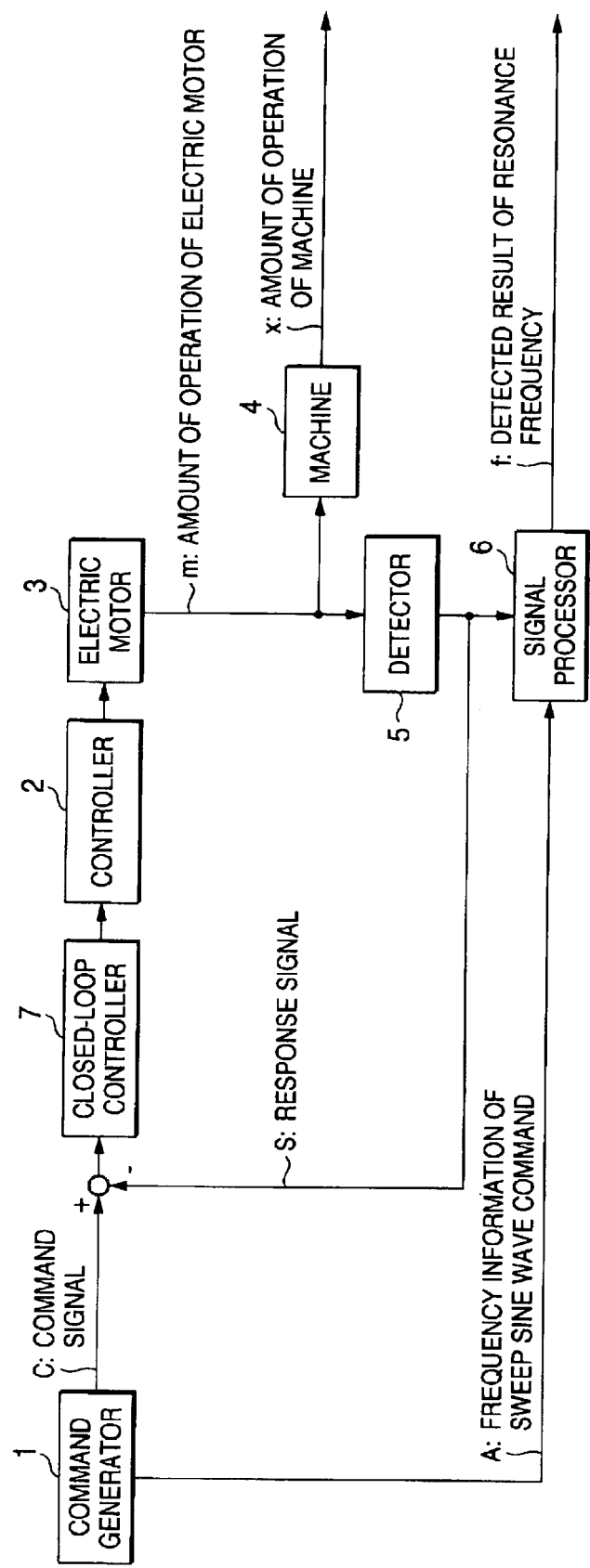
FIG. 3 is a block diagram showing the structure of a third embodiment.

FIG. 3 is a block diagram showing the structure of a third embodiment in which an electric motor control system forms a closed loop. In this embodiment, a detector 5 is provided so as to detect an amount m of operation of an electric motor 3. Further, a closed-loop controller 7 is provided in the pre-stage of a controller 2. A subtracter is provided in the pre-stage of the closed-loop controller 7. Then, a command applied to the (+) terminal of the subtracter is compared with the signal of the detector 5. The closed-loop controller 7 receiving the difference operates to decrease the difference and outputs a command to the controller 2. A command generator 1 and a signal processor 6 are added to a closed-loop control system and a command signal C of the command generator 1 is applied to the (+) terminal of the subtracter. The signal processor 6 receives the frequency information A of a sweep sine wave command outputted by the command generator 1 and a response signal S outputted from the detector 5 to decide the frequency of a sweep sine wave when the absolute value of the response signal S becomes maximum as a resonance frequency and output the detected result f a resonance frequency.

Figure 4:
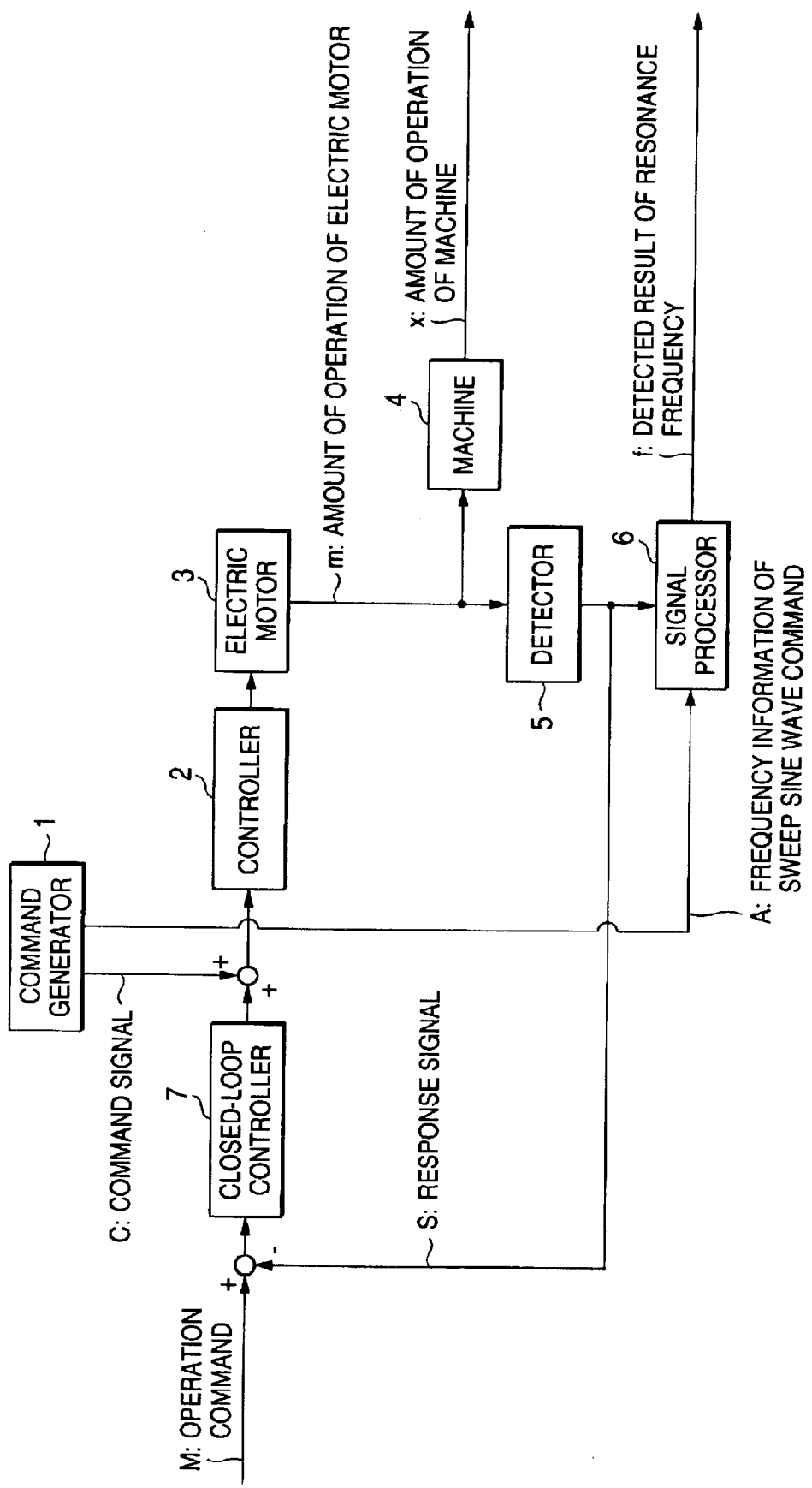
FIG. 4 is a block diagram showing the structure of a fourth embodiment.

FIG. 4 is a block diagram showing the structure of a fourth embodiment. In FIG. 3, the command signal C outputted by the command generator 1 is applied to the (+) terminal of the subtracter. However, in FIG. 4, this is changed, so that a command signal is supplied to one input terminal of an adder provided between a controller 2 and a closed-loop controller 7. In such a structure, the frequency of a sweep sine wave when the absolute value of a response signal S becomes maximum is determined to be a resonance frequency to output the detected result f of the resonance frequency in the same manner as that of the case of FIG. 3. In FIGS. 3 and 4, the detector 5 is connected to the electric motor 3 to detect the amount m of operation of the electric motor, however, the detector 5 may be connected to a machine 4 to directly detect an amount x of operation of the machine.

Figure 5:
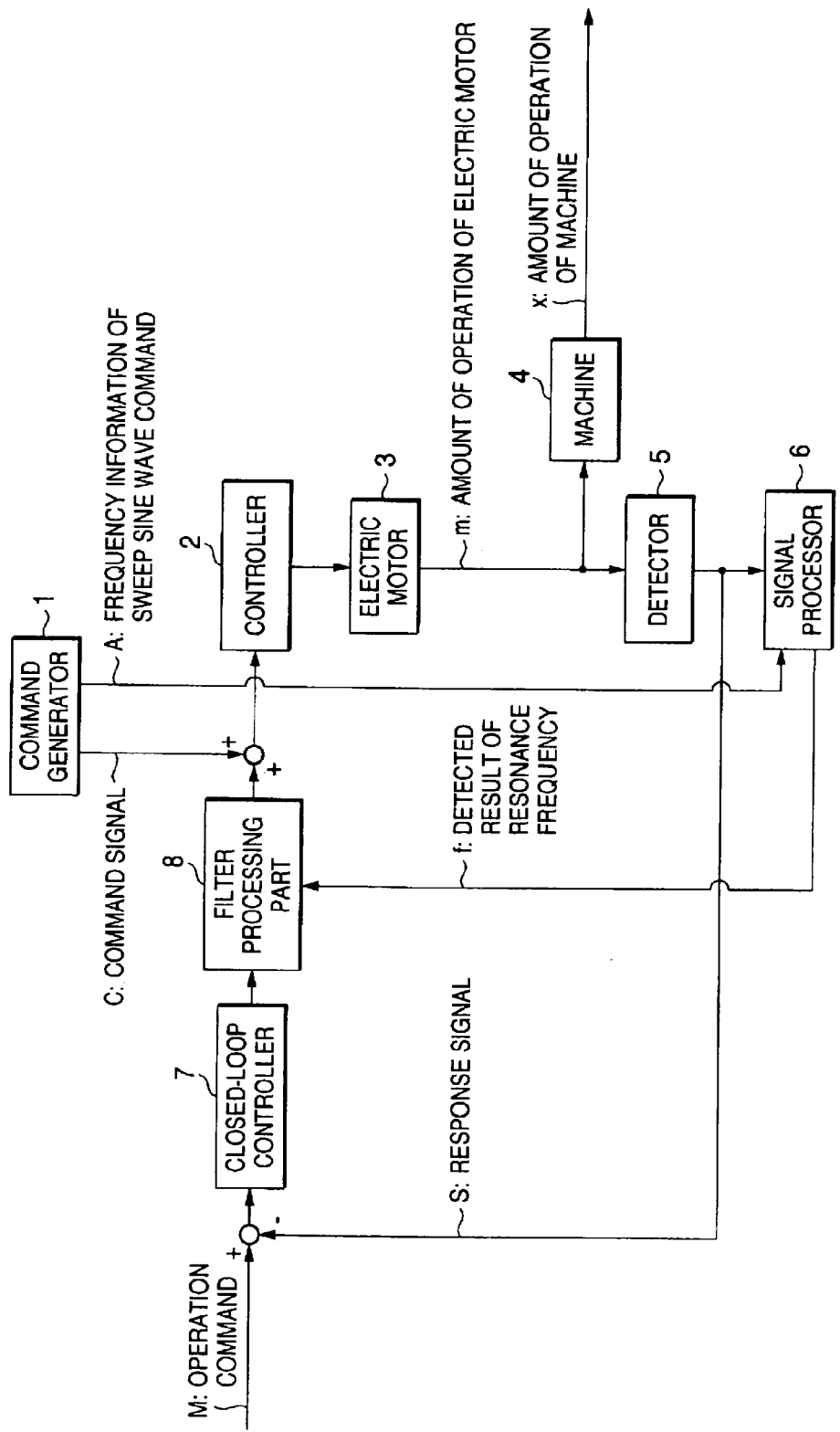
FIG. 5 is a block diagram showing the structure of a fifth embodiment.

FIG. 5 is a block diagram showing the structure of a fifth embodiment. In a structure shown in FIG. 5, a filter processing part 8 is added to a post-stage of the closed-loop controller 7 shown in FIG. 4. The filter processing part 8 can externally supply a command to change filter characteristics. When a signal processor 6 detects a resonance frequency and inputs the detected result f of the resonance frequency to the filter processing part 8 in the same manner as that of the fourth embodiment, the filter processing part 8 is set in accordance with the input so that the filter processing part can serve as a filter for suppressing the band characteristics of the resonance frequency. When the resonance frequency can be detected, the set value of the filter processing part 8 can be automatically determined on the basis of the detected result f of the resonance frequency.

In this embodiment, a command signal C is supplied to one input of an adder provided between the filter processing part 8 and a controller 2, however, the command signal C may be inputted to the (+) terminal of a subtracter provided before the closed-loop controller 7.

Figure 6:
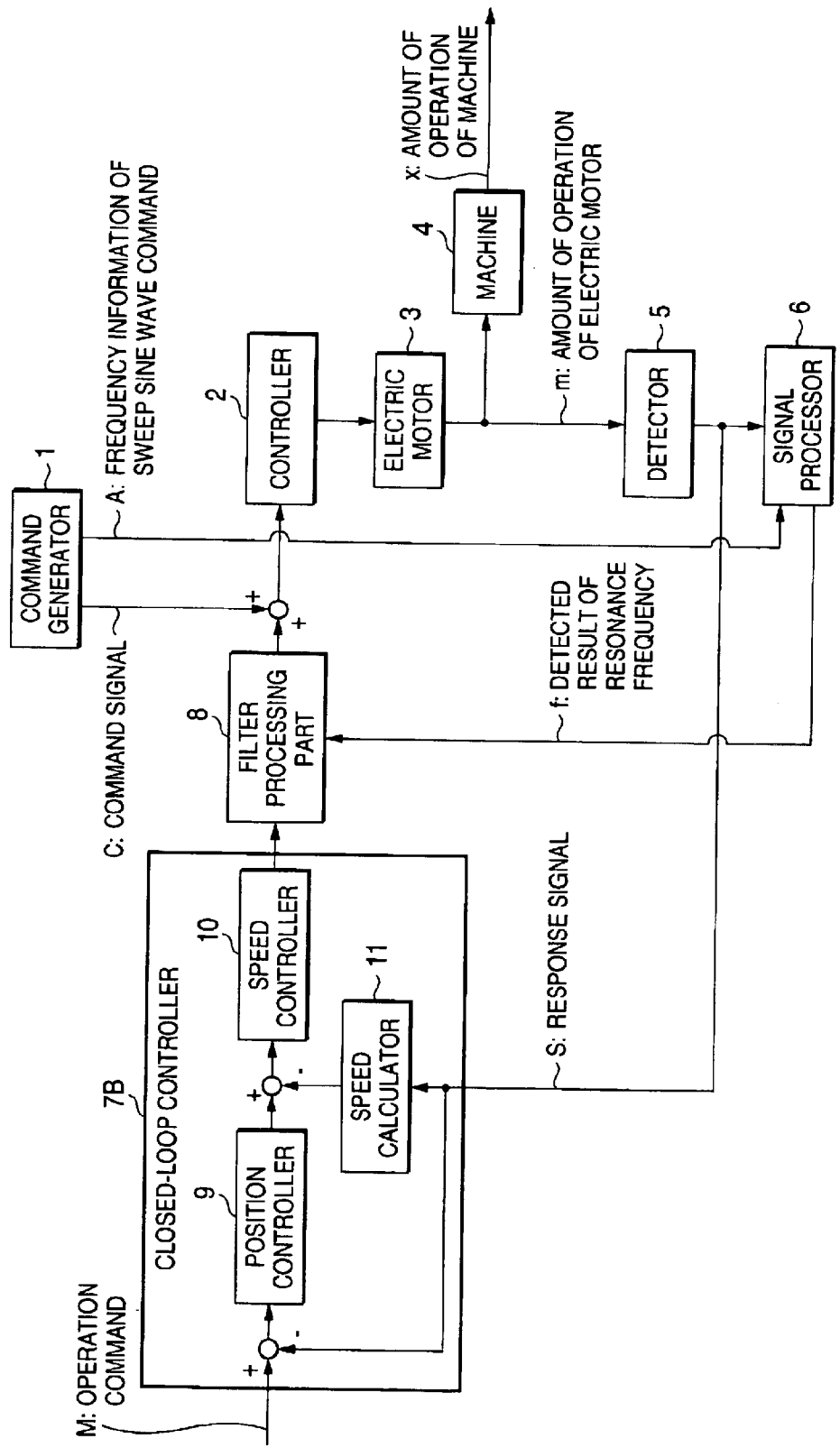
FIG. 6 is a block diagram showing the structure of a sixth embodiment.

FIG. 6 is a block diagram showing the structure of a sixth embodiment. In a structure shown in FIG. 6, the structure of the closed-loop controller 7 shown in FIG. 5 and a part in the vicinity of the subtracter provided before the closed-loop controller is changed. A closed-loop controller 7B includes a subtracter and a position controller 9, a subtracter, a speed controller 10 and a speed calculator 11. In FIG. 6, to the (+) terminal of the subtracter located in the pre-stage of the position controller 9, an operation command M with the magnitude of 0 is supplied. Thus, a resonance frequency is detected without a deviation. In the closed-loop controller 7B, a response signal obtained by detecting an amount m of operation of an electric motor is inputted to the position controller 9 via the subtracter and inputted to the speed controller 10 via the speed calculator 11 at the same time. Then, the speed controller 10 controls so that an output corresponds to the output of the position controller 9. The position controller 9 controls so that the position of the amount m of operation of the electric motor corresponds to the 0 position of the operation command M. A resonance frequency is obtained in the same manner as those of the embodiments of FIGS. 1 to 5. A detector may be connected to a machine 4 to directly detect an amount of operation of the machine like the case of FIG. 5. When the electric motor 3 or the machine 4 have no problem of displacement, a command signal C may be inputted in place of the operation command signal M to detect the resonance frequency. Further, in the above-described embodiment, for instance, when a plurality of filters are set in a filter processing part 8 for the purpose of detecting the resonance frequency, if the set frequency of the filter is limited to avoid the interference between the filters, the range of the frequency may be limited to detect the frequency. Further, the maximum value of an absolute value not smaller than an arbitrarily set frequency Flim and not larger than Fmax may be detected to determine it as the resonance frequency.

Figure 7:
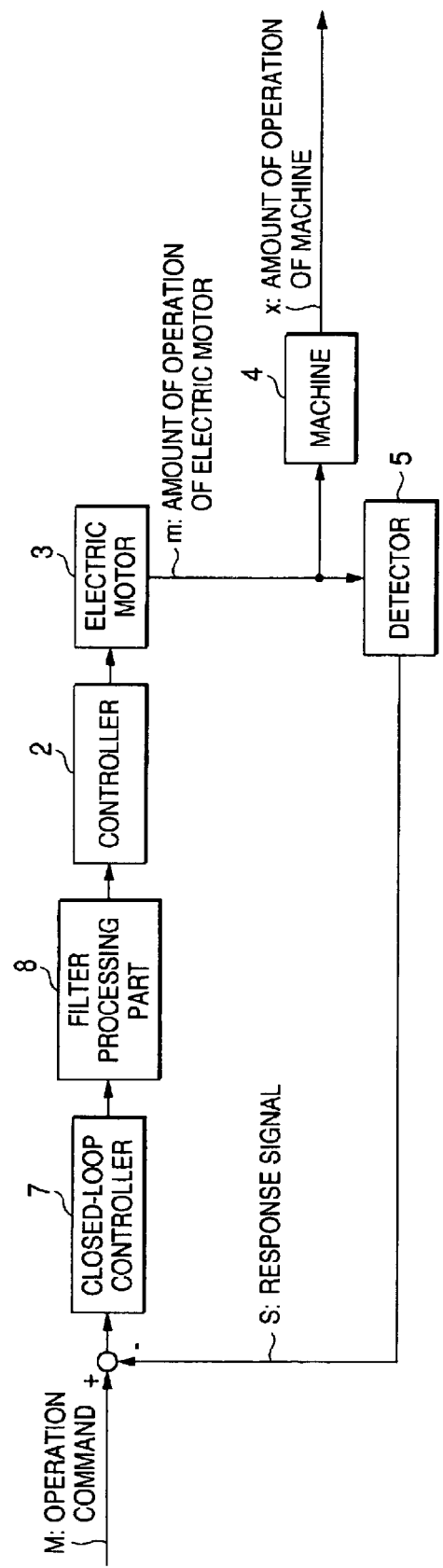
FIG. 7 is a block diagram showing a structure after a filter is set.

FIG. 7 is a block diagram showing a structure when a filter processing part is set on the basis of the resonance frequency detected in FIGS. 5 and 6, and then, the set filter processing part performs an ordinary operation. When an operation command M is inputted to this control system, a closed-loop controller 7 controls so that an amount m of operation of an electric motor corresponds to the operation command M and the filter processing part for suppressing a resonance effectively functions so that the amount m of operation of the electric motor more easily corresponds to the operation command M.

The structure shown in FIG. 7 may be switched to the structure shown in FIG. 5 by providing a switch. Further, although in FIGS. 3, 4, 5 and 7, the closed-loop controller 7 is shown as one controller, the closed-loop controller may include the position controller 9, the speed calculator 11 and the speed controller 10 as shown in FIG. 6. Further, when the operation of the electric motor 3 is controlled so that an amount of operation of a machine corresponds to a command signal on the basis of a response signal S detected by a detector 5, the closed-loop controller 7 may have an inner structure changed. The structure or the sequence including the filter processing part 8 or a controller 2 may be changed.

Figure 10:
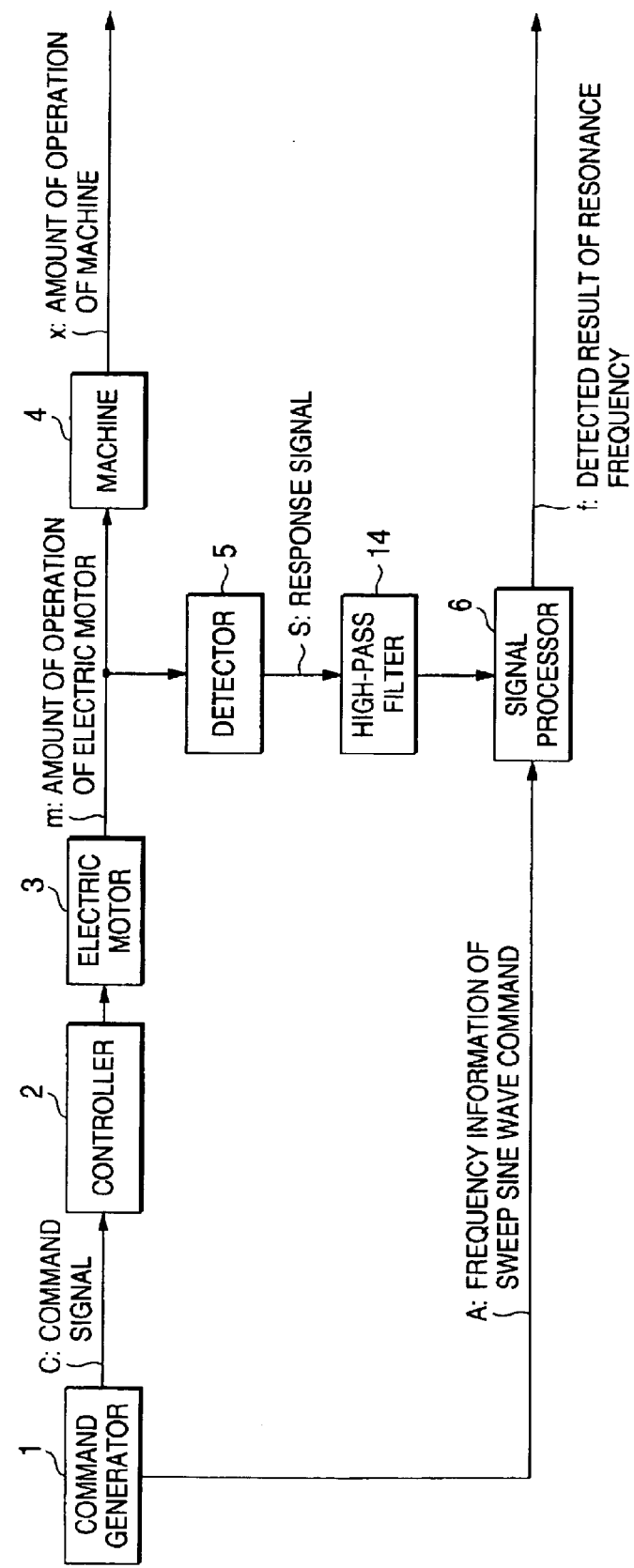
FIG. 10 is a block diagram showing the structure of a seventh embodiment.
Figure 11:
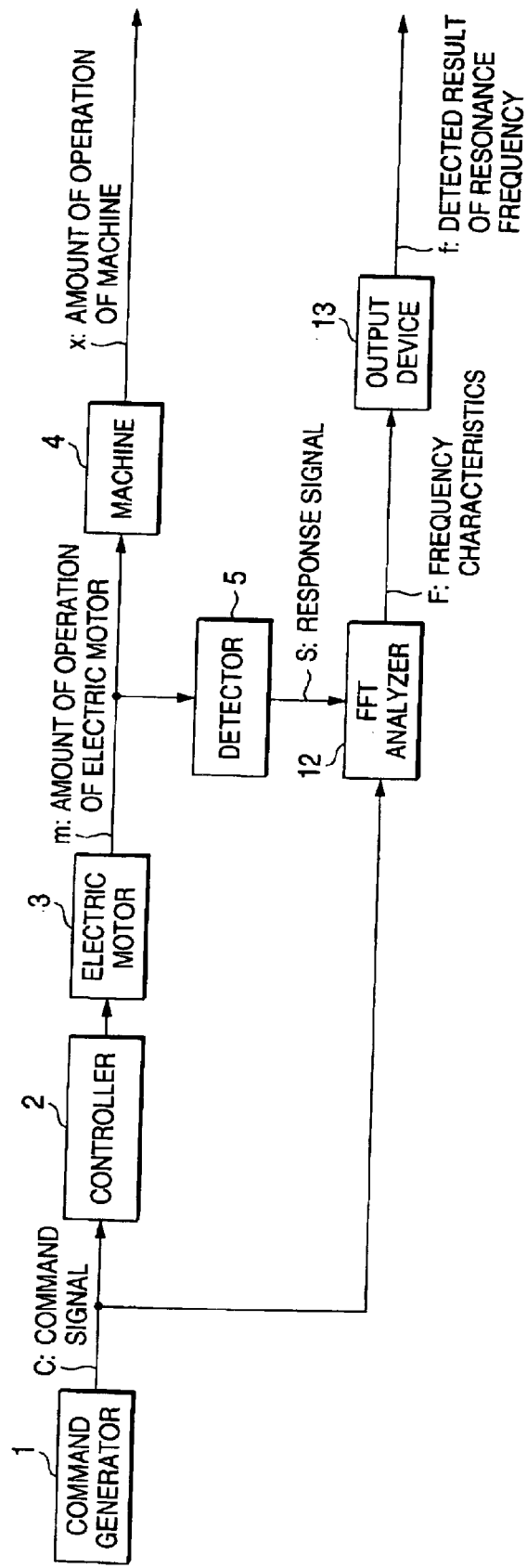
FIG. 11 is a block diagram showing the structure of an electric motor control system to which a prior art is applied.
Figure 12:
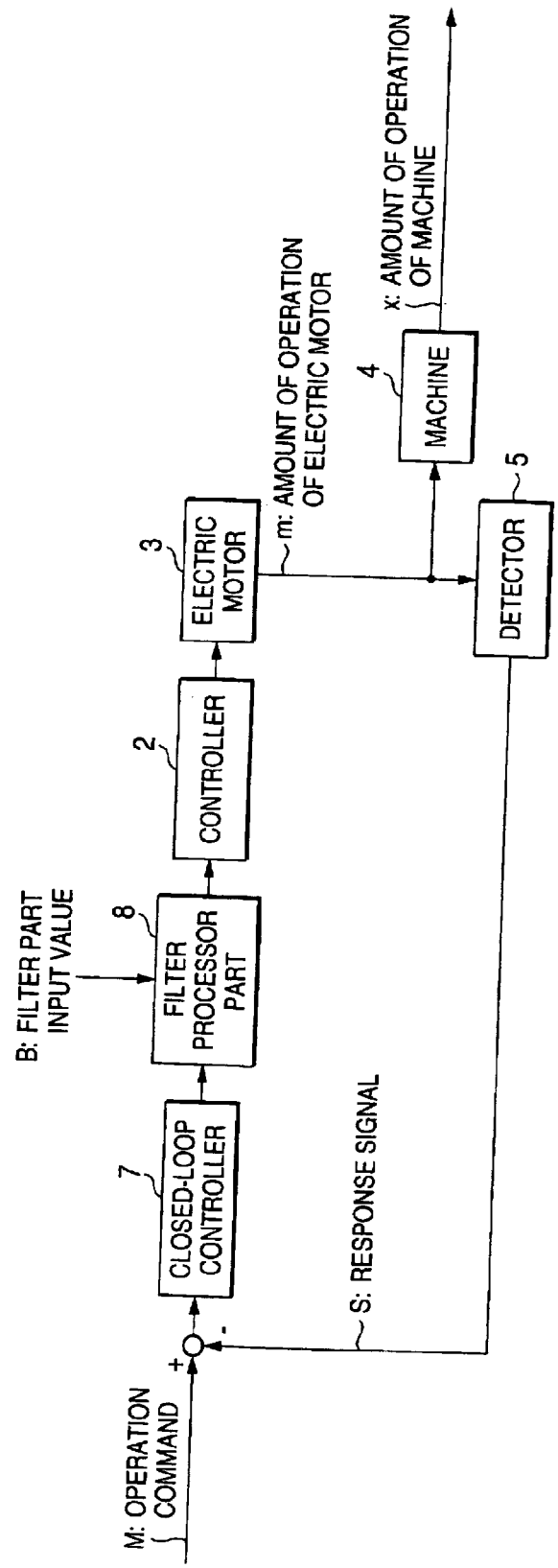
FIG. 12 is a block diagram showing a structure after a filter according to the prior art is set.

FIG. 10 is a block diagram showing the structure of a seventh embodiment. In FIG. 10, reference numeral 1 designates a command generator, 2 designates a controller, 3 designates an electric motor, 4 designates a machine, 5 designates a detector, 6 designates a signal processor and 14 designates high-pass filter means.

FIG. 10 is different from FIG. 1 in a point that the detector 5 detects an amount m of operation of the electric motor and supplies the amount of operation of the electric motor to the signal processor 6 as a response signal S via the high-pass filter means 14. The signal processor 6 receives the frequency information A of a sweep sine wave command and the response signal S, removes the offset part or the low frequency component of the signal from the response signal S in the high-pass filter means 14. Thus, the signal processor determines the frequency of the sweep sine wave when the absolute value of the response signal S becomes maximum as a resonance frequency and outputs the detected result f of the resonance frequency.

In this embodiment, the signal processor 6 does not have a condition of a detected minimum lower limit frequency $F_{lim}$ or higher, however, the signal processor 6 may determine the frequency of the sweep sine wave not lower than the detected minimum lower limit frequency $F_{lim}$ when the absolute value of the response signal S becomes maximum to be the resonance frequency and output the detected result f of the resonance frequency in the same manner as that of the first embodiment.

Further, the detector 5 detects the amount m of operation of the electric motor, however, the detector 5 may detect an amount x of operation of the machine 4.

INDUSTRIAL APPLICABILITY

According to the present invention, since the resonance frequency detector has the structure defined in claims, the resonance frequency can be calculated at high speed by a simple calculation and can be effectively detected by using an inexpensive calculator. Further, the resonance frequency is detected and a filter processing input value for suppressing the resonance frequency is automatically inputted and set to a filter processing part so that the performance of an electric motor controller can be effectively automatically improved.

What is claimed is:

1. A resonance frequency detector for an electric motor controller, for an electric motor control system including an electric motor for driving a machine, a detecting unit for detecting an amount of operation of the machine, and a controller for receiving a control command to drive the electric motor, wherein the electric motor control system comprises:
a command generator that generates a sweep sine wave signal to input the signal to the electric motor control system; and
a signal processor that inputs a frequency information of the sweep sine wave signal outputted from the command generator and the signal of the detecting unit, and outputs the frequency of the sweep sine wave signal when the absolute value of the signal of the detecting unit becomes maximum as a resonance frequency.

2. The resonance frequency detector for an electric motor controller according to claim 1,
wherein the detecting unit detects the position or the speed of the electric motor, or the position or the speed of the machine as the amount of operation.

3. The resonance detector for an electric motor controller according to claim 1 or 2, wherein when the electric motor control system is an open loop, the signal of the command generator is inputted to the controller.

4. The resonance frequency detector for an electric motor controller according to claim 1 or 2, wherein when the electric motor control system includes a subtracter that inputs the signal of the detecting unit to a (−) terminal, and a closed-loop controller that receives the signal of the subtracter and outputs a control command to the controller, to form a closed-loop, the signal of the command generator is inputted to a (+) terminal of the subtracter.

5. The resonance frequency detector for an electric motor controller according to claim 1 or 2, wherein when the electric motor control system includes the subtracter that inputs the signal of the detecting unit to the (−) terminal, the closed-loop controller that receives the signal of the subtracter and outputs the control command, and a filter processing part that inputs the control command, reduces the signal of a prescribed band and then outputs the signal to the controller, to form a closed-loop, an adder is provided between the filter processing part and the controller, the signal of the command generator is inputted to one input thereof, and the sum of the signal of the command generator and the signal of the filter processing part is inputted to the controller.

6. The resonance frequency detector for an electric motor controller according to any one of claims 1 or 2,
wherein the frequency of the sweep sine wave signal is limited to a range from a minimum frequency $F_{min}$ to a maximum frequency $F_{max}$, and
the signal processor limits the signal of the detecting unit to a prescribed frequency range, and inputs the limited signal and detects only the frequency not lower than the minimum frequency $F_{min}$.

7. The resonance frequency detector for an electric motor controller according to any one of claims 1 or 2,
wherein the frequency of the sweep sine wave signal is limited to the range from the minimum frequency $F_{min}$ to the maximum frequency $F_{max}$, and
the signal processor limits the signal of the detecting unit to the prescribed frequency range, and inputs the limited signal and detects only the frequency not lower than a detected minimum frequency Flim higher than the minimum frequency $F_{min}$.

8. The resonance frequency detector for an electric motor controller according to any one of claims 1 or 2, wherein a high-pass filter is provided between the detector and the signal processor.

* * * * *